United States Patent [19]
Shigesada et al.

[11] Patent Number: 5,347,868
[45] Date of Patent: Sep. 20, 1994

[54] PRESSURE GAUGE FOR THIXOTROPIC LIQUIDS

[75] Inventors: Keiji Shigesada; Norio Shibata; Syozo Akiyama, all of Kanagawa, Japan

[73] Assignee: Fuji Photo Film Co., Ltd., Kanagawa, Japan

[21] Appl. No.: 107,117

[22] Filed: Aug. 17, 1993

[30] Foreign Application Priority Data

Sep. 28, 1992 [JP] Japan .............. 4-072999[U]

[51] Int. Cl.⁵ .............................. G01L 7/08
[52] U.S. Cl. ........................ 73/715; 73/706; 73/756
[58] Field of Search .......... 73/756, 715, 706, 723–746, 73/861.42, 861.52, 861.32

[56] References Cited

U.S. PATENT DOCUMENTS 3,474,670 10/1969 Rupert ..................... 73/861.32
3,818,765 6/1974 Eriksen ..................... 73/723 X
4,505,157 3/1985 Hong Le ..................... 73/756
4,516,430 5/1985 Kurtz et al. ................. 73/727

Primary Examiner—Richard E. Chilcot, Jr.
Assistant Examiner—Joseph L. Felber
Attorney, Agent, or Firm—Sughrue, Mion, Zinn, Macpeak & Seas

[57] ABSTRACT

A pressure gauge adapted for use in measuring the pressure of a thixotropic fluid subject to aggregation stagnation in which aggregation of the fluid is prevented by controlling stagnation of a magnetic coating liquid in the vicinity of a pressure sensor, and product quality is improved by removing air mixed into the liquid. An outlet is formed at the vertex of a conical holder. An inlet is formed in the conical surface of the holder at a location offset from the center of the cone defining the holder, which is contained in the outlet. A pressure indicator is mounted in the opening portion in the plane of the cone defining the holder.

4 Claims, 2 Drawing Sheets

PRESSURE GAUGE FOR THIXOTROPIC LIQUIDS

BACKGROUND OF THE INVENTION

The present invention relates to a pressure gauge, and more particularly to a pressure gauge adapted for use in measuring the pressure of a thixotropic fluid subject to aggregation stagnation, such as a liquid (magnetic liquid) in which magnetic material is in solution.

Many types of pressure gauges are known. In one of the known pressure gauges, a diaphragm is provided at the pressure introducing portion of the gauge. The amount of deformation of the diaphragm when it is elastically deformed by pressure is used for determining the pressure of the gas or liquid to be measured.

An example of a diaphragm-type pressure gauge is illustrated in FIG. 4. In this pressure gauge, a T-pipe 11 having an inlet A, an outlet B, and a conduit 12 for introducing liquid to a diaphragm acting as a pressure sensor 13 of a pressure indicator 2 is inserted into a pressure gauging portion of a pipe 14. The pressure indicator 2 is attached to the conduit 12. Assuming that the fluid flows through the pipe 14 from the left side to the right side in the figure, the fluid first flows from the inlet A into the T-pipe 11, and is divided into two routes, one destined for the conduit 12 with the pressure indicator 2 attached thereto and the other destined for the outlet B.

As a result, the fluid fills the conduit 12 to push the diaphragm of the pressure indicator 2, thereby to indicate a pressure.

The pressure gauging system which introduces the fluid to the pressure sensor 13 requires space for introducing the fluid, i.e., the conduit 12 of the T-pipe in the pressure gauge of FIG. 4. In the vicinity of the portion where the conduit branches from the pipe, there is little flow of the fluid filling the space due to disturbances caused by the flow of the fluid in the pipe. The fluid flow gradually diminishes away from the branch portion. Since here is little flow, stagnation occurs in the vicinity of the diaphragm.

This phenomenon becomes remarkable as the viscosity of the fluid flowing through the pipe increases, thereby more significantly impeding the fluid flow. This phenomenon does not cause much of a problem when the fluid is gas, water, or a solution of low concentration. However, magnetic fluids containing a mixture of a magnetic substance, chemical destaticizer, lubricant, binder and the like have a high viscosity and poor fluidity, and hence have a strong tendency to stagnate in the vicinity of the diaphragm. The magnetic liquid generally has thixotropic properties. When it is flowing, a magnetic liquid retains a sol-like fluidity due to the shearing force applied to the fluid due to the flow. However, when such a solution stagnates, its consistency becomes gel-like, so that aggregation occurs.

As the aggregation progresses, the diaphragm of the pressure sensor 13 fails to perform its function. A pressure measured under this condition is not correct, so that accurate pressure control in the magnetic material coating process is impossible. Further, the aggregated matter retained in the stagnation region tends to mix with the magnetic liquid as an impurity, so that control of the the magnetic liquid concentration is impossible. Moreover, air that has been carried in together with the magnetic liquid is left in the stagnation region. A disturbance causes air held in the stagnation region to rush into the pipe. The air, together with the aggregated matter, is transported to the coating head. The result is unwanted streaks, bubbles, and the like in the final product.

To manufacture another type of product, the magnetic liquid in the pipe must be replaced by another magnetic liquid. In this case, a fresh magnetic liquid is supplied to the pipe after the inside of the pipe is cleansed by feedinq detergent into the pipe. In the cleaning process, the cleaning fluid tends to collect in the stagnation region, so that insufficient cleaning of the inside of the pipe is obtained. In this respect, the cleaning work is inefficient. As described above, in the pressure gauge for gauging a pressure by introducing the fluid into a pressure sensor of the diaphragm, the conduit 12 forms a stagnation region of the fluid. This stagnation region causes the mixing of the aggregation and air into the magnetic fluid. Reduction of the volume of the fluid introducing portion that defines the stagnation region can be done to control the mixing of the aggregation and air into the magnetic fluid.

A pressure gauge based on the reduction of the volume of the stagnation region is disclosed in Japanese Utility Model Laid-Open Publication No. Hei. 2-9847, for example. In such a pressure gauge, the fluid path is flush with the opening portion where the diaphragm is mounted, and a pressure gauge mounting seat is used, omitting the conduit 12. Further, a restricting portion is provided which restricts the fluid flow gradually from the diaphragm mounting opening portion toward the bottom corresponding to the fluid path. Provision of the restricting portion succeeds in reducing the volume of the space for introducing the fluid present between the diaphragm and the fluid path.

As regards the mounting seat, the space from the fluid path to the diaphragm increases toward the circumferential end of the diaphragm. The fluid flows more slowly in this space than in the vicinity of the fluid path, and hence the fluid is likely to linger in this space. Accordingly, the above pressure gauge also suffers from the above-stated problem. That is, the aggregation of the fluid interrupts the normal operation of the pressure sensor 13 by the diaphragm, impairing the exact gauging of the fluid pressure and precise pressure control in the magnet fluid coating process.

Further, the aggregated matter is mixed into the magnetic liquid as an impurity, making it difficult to control the concentration of the magnetic liquid. Air is also mixed into the liquid. The air, together with the aggregated matter, is transported to the coating head, causing streaks and bubbles in the final product, and hence deterioration of the product quality. In cleaning the inside of the pipe, the cleaning fluid will not flow properly, providing insufficient cleaning. This results in inefficient cleaning work.

In this type of the pressure gauge, a planar diaphragm is mounted in the fluid path (normally tubular) even under the possibly reduced volume in the pressure measuring location, and an empty space essentially exists between the fluid path and the diaphragm. The space provides a stagnation region for the fluid.

SUMMARY OF THE INVENTION

With the view of solving the problems arising from presence of the stagnation region, the present invention has an object the provision of aa pressure gauge which eliminates aggregation of fluid in the pressure measuring location, and satisfactorily cleans the same location when the inside of the pipe is cleansed.

To achieve the above and other objects of the invention, there is provided a pressure gauge in which a pressure sensor is provided in connection with a holder having an inlet and an outlet to and from which fluid is let in and out, and a pressure indicator is connected to the pressure sensor, wherein at least the inner space of the holder is substantially conical, the pressure sensor is provided on the base surface of the conical inner space, the outlet is formed at the vertex of the cone defining the inner space of the holder, and the inlet is disposed close to the base surface of the cone so as to create a flow of the fluid in a direction tangent to the conical surface.

DESCRIPTION OF THE PREFERRED EMBODIMENTS

Preferred embodiments of a pressure gauge constructed according to the present invention will be described with reference to FIGS. 1 and 2.

Figure 1:
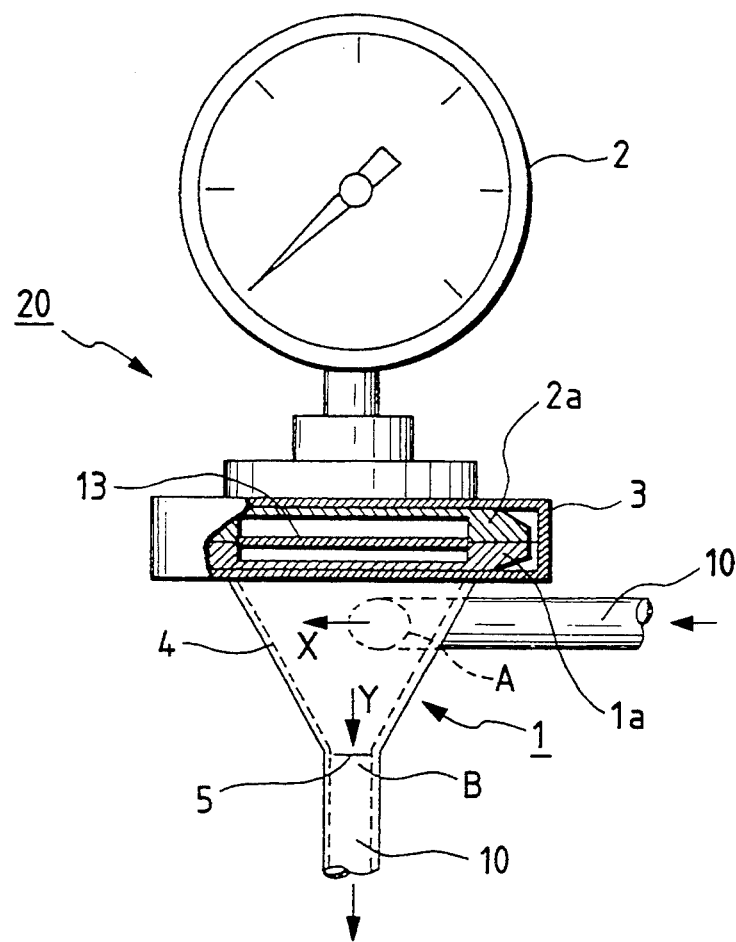
FIG. 1 is a front view, partially in cross section, showing a pressure gauge according to an embodiment of the present invention.
Figure 2:
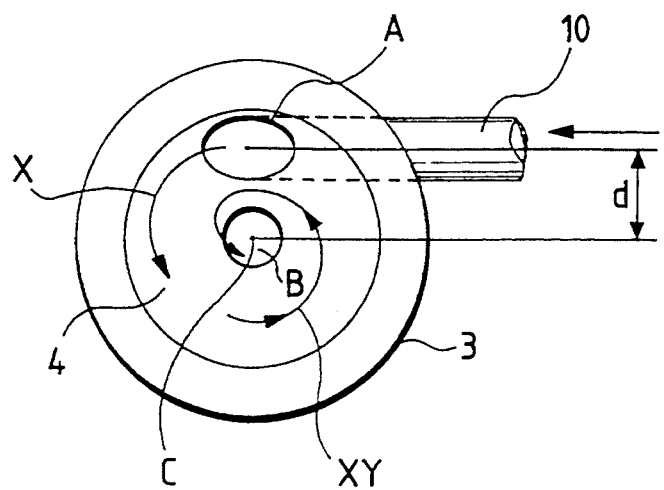
FIG. 2 is a plan view showing the inside of a hold of the pressure gauge shown in FIG. 1.

FIG. 1 is a front view, partially in cross section, showing a pressure gauge constructed according to a preferred embodiment of the present invention, and FIG. 2 is a plan view showing the inside of a hole of the pressure gauge as seen from above.

In a pressure gauge 20, a pressure indicator 2 is mounted on a conical holder 1 having a conical inner space formed therein. A pipe 10 with an outlet B is connected to the vertex 5 of the holder 1. A inlet A, which is equal in diameter to the outlet B, is formed in the conical surface 4 of the holder 1. Another pipe 10 extends outward from the inlet A. More specifically, as best illustrated in FIG. 2 (plan view of the holder 1), the inlet A is formed at a location offset from the center C of the cone defining the holder by a predetermined distance d (closer to the base of the cone), and the pipe 10 extends tangential to the conical surface 4. Accordingly, the fluid fed through the inlet A is substantially parallel to a diaphragm 13 mounted on the base of the cone.

The flange 1a of the holder 1 and the flange 2a of the pressure indicator 2 are coupled together and firmly held by means of a ferrule 3 applied to the coupled flanges, thereby to assemble the pressure gauge 20.

In the pressure gauge 20 thus constructed, a fluid flows from the inlet A into the inner space of the holder 1. In the inner space, the fluid flows circularly (in the direction of an arrow X) along the inner side of the conical surface 4 to fill the inner space and flow out of the inner space through the outlet B. The fluid, when it fills the conical inner space, pushes up the diaphragm 13, which acts as the pressure sensor of the pressure indicator 2, while at the same time rising toward the vertex 5 to flow out of the inner space through the outlet B.

Within the holder 1, the flow of the fluid flowing along the inner side of the conical surface 4 in the circular direction (direction X) and the flow of the fluid flowing toward the outlet B (in the direction Y) are combined to form a spiral flow (direction XY). The spiral flow flows in the form of a spiral stream of fluid as if it were guided by a spiral channel continuing from the conical base area (diaphragm side) toward the vertex of the cone (outlet B). Accordingly, within the holder 1, the fluid supplied from the inlet A spirally flows along the inner side of the conical surface 4 toward the vertex, and is let out through the outlet B.

The inner surface of the conical surface 4 may be subjected to a proper surface treatment, such as resin coating, electrolysis polishing or buffing, in order to prevent the fluid from attaching to the inner wall of the conical surface 4 and to ensure a smooth flow of the spiral fluid within the holder 1.

Thus, within the holder 1 of the pressure gauge 20, the fluid constantly flows without any stagnation. Accordingly, a fluid having thixotropic properties, such as a magnetic liquid, is not allowed to aggregate. The air contained is discharged out of the holder 1 from the outlet B, together with the fluid since no stagnation of the fluid occurs.

In the above-described embodiment, the holder 1 is shaped like a cone. However, it may take any shape so long as the shape of the inner space of the holder is conical, for example, the shape of the conical surface 4, which is curved toward the inner space or outward from the inner space.

Also, while in this embodiment the flow of the fluid emanating from the inlet A is parallel to the pressure sensor 13, it may be slightly slanted toward the diaphragm. When the inlet A is located some distance apart from the base of the conical inner space, stagnation of fluid present closer to the diaphragm can be effectively prevented if the fluid flow is slightly slanted toward the diaphragm.

The pressure indicator 2 of the type in which an operator visually observes a pressure reading on a scale is employed in the above-described embodiment. If required, the same may be connected to a control system.

As described above, the pressure gauge of the invention is constructed such that the inner space of the holder for measuring a pressure is substantially conical, the pressure sensor is provided at the base surface of the conical inner space, the outlet is formed at the vertex of the cone defining the inner space of the holder, and the inlet is disposed close to the base surface of the cone so as to create a flow of the fluid in a direction tangent to the conical surface. With such a construction, a spiral flow of the fluid flowing along the inner side of the conical surface is created, thereby eliminating stagnation of the fluid within the inner space. Accordingly, the present invention succeeds in solving conventional problems arising from the aggregation resulting from the stagnation of the fluid of low viscosity or poor fluidity, inexact gauging of pressure, product quality deterioration owing to the mixing of impurity and air into the fluid, and insufficient cleaning of the inside of the pipe. The present invention thus provides excellent control of a coating process using magnetic liquid, and uniform products based on the magnetic liquid.

The effects of the present invention will be more clearly described by reference to an example.

The constituents shown in Table 1 below were put into a ball mill and sufficiently mixed and dispersed. Subsequently, 30 parts by weight of epoxy resin (epoxy combining weight 500) was added to the mixture. The resultant mixture was uniformly mixed and dispersed, thereby obtaining a magnetic coating liquid (magnetic dispersion liquid). The thus-obtained coating liquid was circulated at the rate of 1000 ml/min in a pipe system a shown in FIG. 3. The state of air removal within the holder was visually observed.

Figure 3:
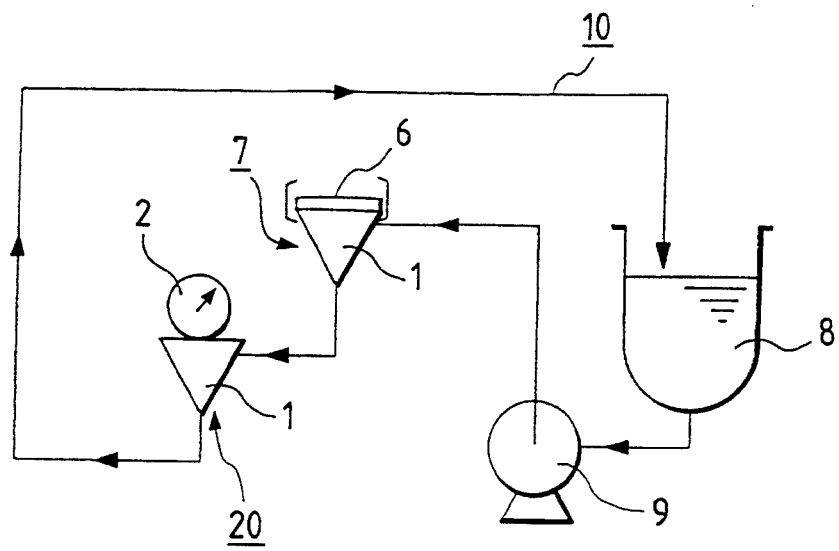
FIG. 3 is a diagram showing a pipe-line system used for observing air within the holder in the embodiment of the invention.

In the pipe system of FIG. 3, a magnetic coating liquid is fed from a storage tank 8 to a pipe system 10, by a pump 9, and stored in the storage tank 8. A pressure gauge 20 including a pressure indicator 2 mounted on a holder 1 and an air check device 7 having a glass plate 6 to air check instead of a pressure indicator are inserted midway of the pipe system 10.

TABLE 1

| No. | Constituent | Amount (wt %) |
| --- | --- | --- |
| 1 | $\gamma$-Fe$_2$ powder (needle particles of 0.5 $\mu$m in average particle diameter as seen in the longer diameter, coercive force of 320 oersted) | 300 |
| 2 | Polyvinyl chloride-acetate (copolymer ratio 87:13, polymerization degree 400) | 30 |
| 3 | Conductive carbon | 20 |
| 4 | Polyamide resin (amide valance 300) | 15 |
| 5 | Lecithin | 6 |
| 6 | Silicon oil (Dimethyl polysiloxane) | 3 |
| 7 | Xylol | 300 |
| 8 | Methylisobutyl ketone | 300 |
| 9 | n-butanol | 100 |

The magnetic coating liquid was circulated in the pipe system 10. After a predetermined time, air was introduced into the pipe and the residence time of air within the holder 1 was measured. Bubbles disappeared after approximately 1.3 seconds on the average. The flow of the magnetic coating liquid was rotated.

Figure 4:
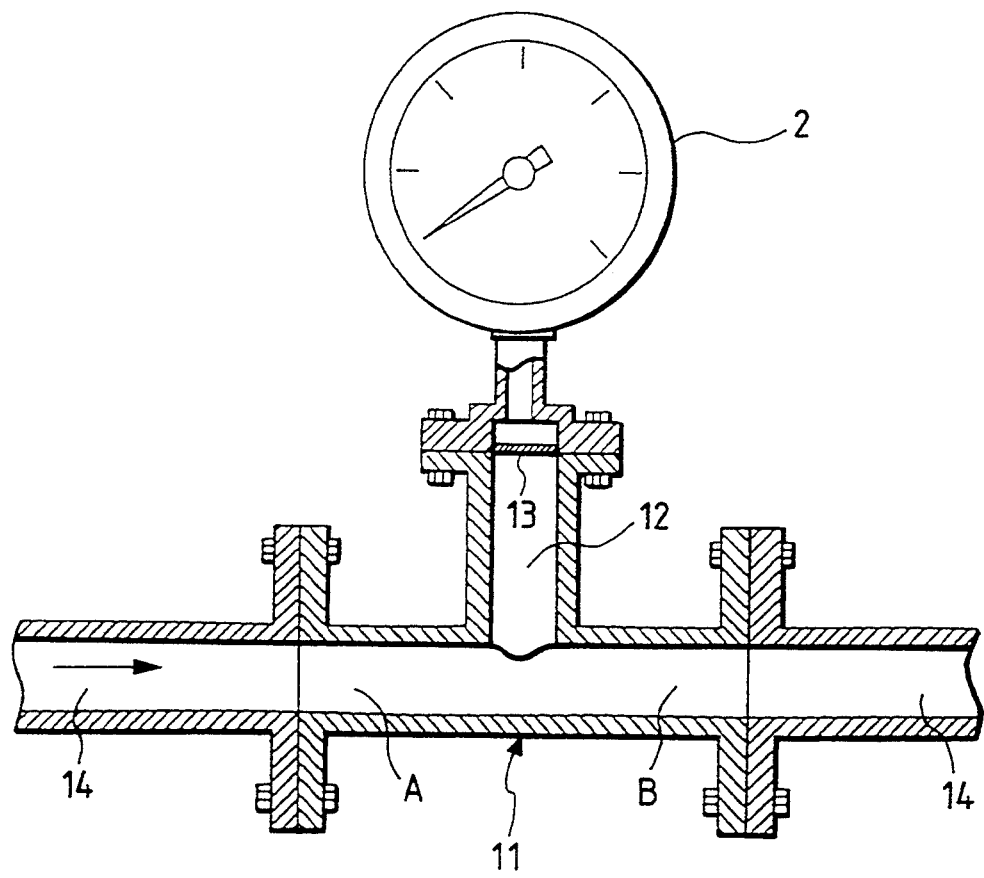
FIG. 4 is a partial cross-sectional view showing a conventional pressure gauge.

For comparison, a glass plate 6 was mounted on the top of the conduit 12 of the T-pipe 11 shown in FIG. 4. The state of air discharge was observed under the same conditions. Bubbles were left stagnated in the conduit 12 of the T-pipe 11 after one minute.

Thus, the example of the invention satisfactorily eliminates stagnation of the magnetic coating liquid when comparing with the conventional pressure gauge.

What is claimed is:

1. In a pressure gauge comprising a pressure sensor, a holder having an inlet and an outlet to and from which fluid is let in and out, and a pressure indicator connected to said pressure sensor, the improvement wherein at least an inner space of said holder is substantially conical, said pressure sensor is provided on a base surface of said conical inner space, said outlet is formed at a vertex of said conical inner space, and said inlet is disposed in a conical surface of said conical inner space close to said base surface of said conical inner space so as to create a flow of fluid in a direction tangent to said conical surface of said conical inner space and such that the incoming fluid from said inlet flows parallel to said base surface of said pressure sensor.

2. The pressure gauge of claim 1, wherein a diameter of said inlet is substantially the same as a diameter of said outlet.

3. The pressure gauge of claim 1, wherein an inner surface of said cone is subjected to a surface treatment to prevent fluid from adhering to said inner surface and to ensure a smooth flow of fluid within said cone.

4. The pressure gauge of claim 3, wherein said surface treatment is selected from the group consisting of resin coating, electrolysis polishing and buffing.

* * * * *